(12) United States Patent  (10) Patent No.: US 7,730,632 B2
Caldi  (45) Date of Patent: Jun. 8, 2010

(54) COMBINATION TAPE MEASURE AND HAMMER

(76) Inventor: Anthony B. Caldi, 17 Mills Ridge, Sparta, NJ (US) 07871

( * ) Notice: Subject to any disclaimer, the term of this patent is extended or adjusted under 35 U.S.C. 154(b) by 0 days.

(21) Appl. No.: 12/173,940

(22) Filed: Jul. 16, 2008

(65) Prior Publication Data

US 2009/0038172 A1 Feb. 12, 2009

Related U.S. Application Data

(60) Provisional application No. 60/963,777, filed on Aug. 7, 2007.

(51) Int. Cl.
*G01B 3/10* (2006.01)
*B25B 15/00* (2006.01)

(52) U.S. Cl. .............. 33/760; 33/761; 33/768; 7/143; 81/20

(58) Field of Classification Search ........... 33/760–761, 33/768, 770; 7/143, 146, 165; 81/20–27, 81/492
See application file for complete search history.

(56) References Cited

U.S. PATENT DOCUMENTS

| 2,483,193 | A | * | 9/1949 | Glaskin | 7/143 |
| 3,119,424 | A | * | 1/1964 | Henry | 7/143 |
| 3,798,687 | A | * | 3/1974 | Stevens | 7/129 |
| 5,063,627 | A | | 11/1991 | Marra | |
| 5,103,574 | A | | 4/1992 | Levy | |
| 5,119,521 | A | | 6/1992 | Clontz | |
| D375,033 | S | * | 10/1996 | Edwards | D8/75 |
| D410,184 | S | | 5/1999 | Bulcock | |
| 6,088,862 | A | | 7/2000 | Bulcock | |
| 6,122,788 | A | | 9/2000 | Bulcock | |
| 6,279,876 | B1 | | 8/2001 | Massie | |
| D517,888 | S | * | 3/2006 | DeBoer et al. | D8/81 |
| 7,013,516 | B1 | | 3/2006 | Peters | |
| 7,080,576 | B2 | | 7/2006 | Johnson et al. | |
| 7,086,109 | B2 | * | 8/2006 | Fisher et al. | 7/165 |
| 7,178,257 | B2 | | 2/2007 | Kang et al. | |
| 7,296,366 | B2 | * | 11/2007 | Lin | 33/760 |
| D569,748 | S | * | 5/2008 | Caldi | D8/81 |
| 7,467,572 | B2 | * | 12/2008 | Fisher et al. | 81/25 |
| 2006/0048305 | A1 | | 3/2006 | Giordano et al. | |
| 2006/0090605 | A1 | | 5/2006 | Fisher et al. | |
| 2006/0243099 | A1 | | 11/2006 | Johnson et al. | |
| 2007/0074605 | A1 | * | 4/2007 | Smith | 81/20 |
| 2007/0079445 | A1 | * | 4/2007 | Siebeck | 7/164 |
| 2007/0234483 | A1 | * | 10/2007 | Kunz et al. | 7/143 |
| 2008/0256816 | A1 | * | 10/2008 | Cosentino | 33/760 |
| 2009/0000038 | A1 | * | 1/2009 | Padden | 7/128 |

* cited by examiner

*Primary Examiner*—Yaritza Guadalupe-McCall
(74) *Attorney, Agent, or Firm*—Doherty IP Law Group LLC

(57) ABSTRACT

A combination tape measure and hammer includes a tape measure having an extendible tape for measuring distances, and a hammer attached to the tape measure. The tape measure includes a housing with an outer surface and the hammer conforms to the outer surface of the housing. The outer surface of the housing is curved and an underside of the hammer is curved for conforming to the curved outer surface of the housing. The hammer includes a head and a claw extending rearwardly from the head. The outer surface of the housing has a depression formed therein that is aligned with the claw. The claw is a forked claw including a first tine and a second tine spaced from the first tine. The depression formed in the outer surface of the housing is aligned with the first and second tines.

17 Claims, 3 Drawing Sheets

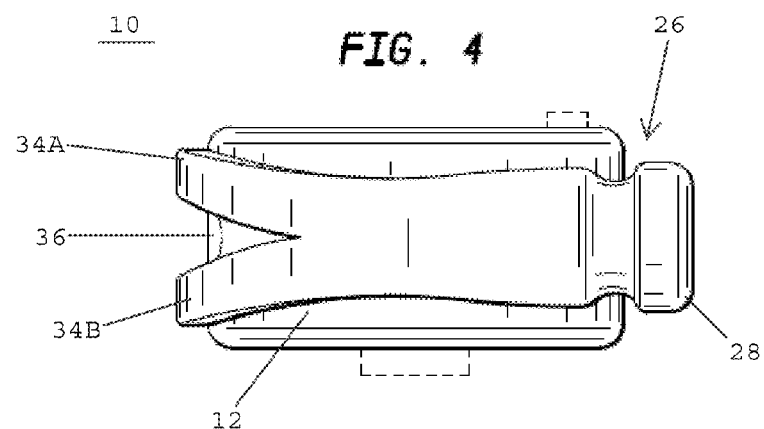
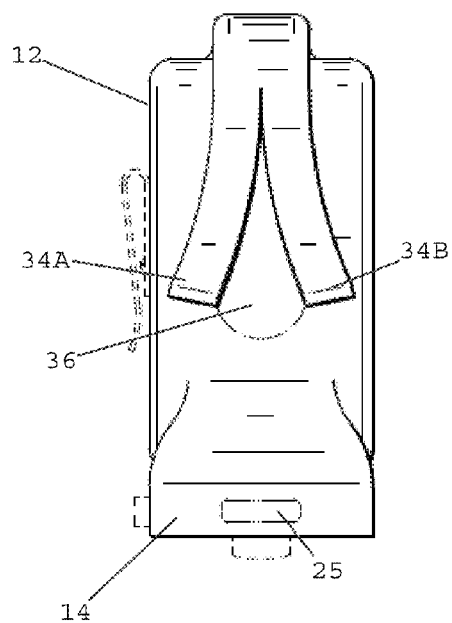
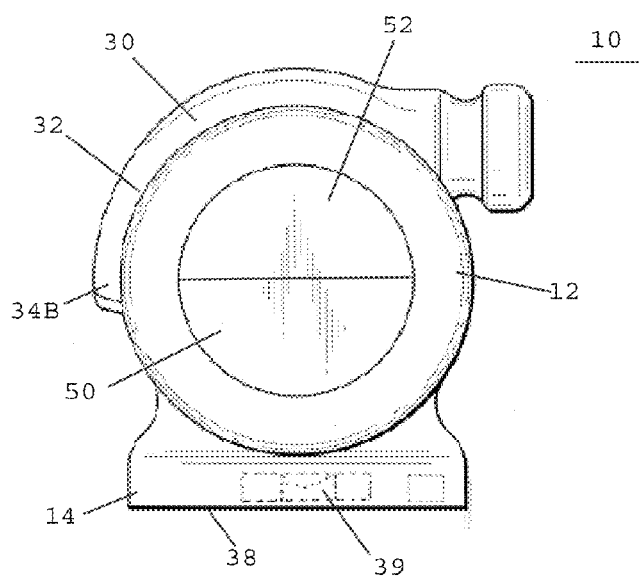
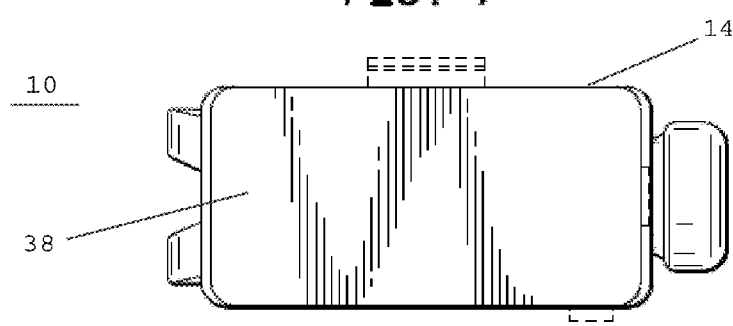

COMBINATION TAPE MEASURE AND HAMMER

CROSS REFERENCE TO RELATED APPLICATIONS

The present application claims the benefit of U.S. Provisional Appln. No. 60/963,777, filed Aug. 7, 2007, the disclosure of which is hereby incorporated by reference herein.

BACKGROUND OF THE INVENTION

1. Field of the Invention

Embodiments of the present invention generally relate to hand tools. More specifically, embodiments of the present invention relate to a tape measure having a hammer integrally formed therewith.

2. Description of the Related Art

In the home, at the office, or on construction sites, hand tools are often used to perform various functions. Some of these well-known tools include screw drivers, hammers, saws, straight edges, leveling devices, and tape measures. In many instances, an individual is required to simultaneously hold two or more tools to perform a particular function. For example, an individual may be required to simultaneously hold nails, a tape measure and a hammer for accurately positioning nails in a construction beam, or a wall. This is often a frustrating experience for an individual who may be incapable of successfully juggling numerous tools at one time.

In order to overcome the above-mentioned problems, there have been many efforts directed to combining multiple tools into a single instrument. Among these efforts, U.S. Pat. No. 6,122,788 to Bulcock discloses a hammer having a handle that has one or more storage compartments formed therein. The storage compartments are used to store items such as nails, tacks and screws. A measuring tape, secured to the bottom of the handle, unrolls in a direction that is perpendicular to the length of the handle.

U.S. Pat. No. 5,119,521 to Clontz teaches a retractable tape measure that is adapted for installation in the elongate handle of a tool such as a hammer. The tape measure includes a frame, a roll of flexible tape, a coil spring and gears. The frame is an elongate piece of metal slightly wider than the tape and the coil spring. The tape measure assembly may be mounted to the free end of the handle of the tool. In use, the free end of the tape is pulled from the bottom of the handle in a direction that is parallel to the longitudinal axis of the handle.

U.S. Pat. No. 7,080,576 to Johnson et al. discloses a multi-accessory hammer that is adapted to have a wide range of different tools attached to the butt of the handle. The tools attachable to the butt of the handle include a crowbar, a fastener removal accessory, an elastic striking element, a metal striking element, and a retractable tape measure.

U.S. Pat. No. 7,013,516 to Peters discloses a hammer having a hammer head with a front portion adapted to strike a nail or tack, and a handle having a longitudinal cavity extending therein. The hammer includes a tray tailored to fit and slide within the longitudinally extending cavity. The tray is adapted to support a plurality of accessories. In one embodiment, an end cap securable to the butt end of the handle includes a retractable measuring tape incorporated therein.

Although the above-described advances have effectively combined multiple functions into a single tool, the above-described tools remain bulky, difficult to handle and lack a compact design. Thus, there remains a need for combination tools that are compact and easy to use, and in particular there remains a need for a combination tape measure and hammer tool that is compact and easy to use.

SUMMARY OF THE INVENTION

The present invention provides a combination tape measure and hammer. As noted above, prior art combination tools teach a conventional hammer having an elongated handle, with a tape measure attached to the bottom or butt end of the elongated handle. This type of structure is very large and bulky, making the combination tool difficult to store, carry and use. The present invention improves upon these prior art combination tools by integrating only the head and claw portion of a hammer into a tape measure. In at least one embodiment, this combination tool does not have an elongated handle. Thus, the present invention provides a structure that is more compact and sleeker than prior art tools, and a tool that is easier to store, carry and use.

In one embodiment of the present invention, a combination tape measure and hammer includes a tape measure having an extendible tape for measuring distances, and a hammer attached to the tape measure. The tape measure desirably includes a housing having an outer surface and the hammer is attached to the outer surface of the housing. The hammer may conform to the outer surface of the housing. In one embodiment, the outer surface of the housing is curved and an underside of the hammer is curved for conforming to the curved outer surface of the housing.

In one embodiment, the hammer includes a head for striking objects such as nails, and a claw extending rearwardly from the head. The outer surface of the housing has a depression formed therein that is aligned with the claw. The depression may provide a gap between the underside of the claw and the outer surface of the housing. As will be described in more detail below, the gap provided by the depression enables the heads of fasteners to fit between the claw and the housing when using the claw to remove a fastener from a structure.

In one embodiment, the claw is a forked claw including a first tine and a second tine spaced from the first tine. The depression formed in the outer surface of the housing is desirably aligned with the first and second tines.

In one embodiment, the combination tool is made of metal. In this embodiment, the hammer and the housing are made of metal and are integrally formed with one another. The base connected with the housing may also be made of metal and be integrally formed with the housing. In other embodiments, the base may be a separate piece that is connected to the housing, such as a separate metal or plastic piece.

In one embodiment, the tool may include a writing instrument receptacle formed in the housing for holding a writing instrument such as a pencil or pen. The tool also desirably includes a base secured to the housing for securing or stabilizing the housing atop a surface. In one embodiment, the tool may include a spring coupled with the tape for selectively retracting the tape. The spring may be provided in the housing. The tool may also have a button coupled with the spring, the button being depressible for retracting the tape. In one embodiment, the tool includes a clip such as a flexible clip used for securing the tool to a belt or waistband.

In another embodiment of the present invention, a combination tape measure and hammer includes a tape measure having a housing with a curved outer surface, and a hammer attached to the housing, whereby the hammer conforms to the curved outer surface of the housing. The hammer desirably includes a head and a claw that conforms to the curved outer surface of the housing. In one embodiment, the hammer is integrally formed with the housing of the tape measure. The curved outer surface of the housing may have a depression formed therein and at least a section of the claw is aligned with the depression. The section of the claw aligned with the depression is desirably spaced from the housing.

In another embodiment of the present invention, a tool for measuring distances and hammering includes a tape measure having a housing with an outer surface, a tape disposed within the housing and being extendible from the housing, and a hammer attached to and conforming to the outer surface of the housing. The hammer desirably includes a head for striking an object and a claw that extends rearwardly from the head, whereby the claw is curved and conforms to the outer surface of the housing.

In one embodiment, a combination tape measure and hammer includes a tape measure having an extendible tape for measuring distances, and a hammer attached to the tape measure.

In one embodiment, the tape measure includes a housing having an outer surface and the hammer is attached to the outer surface of the housing.

In one embodiment, the hammer conforms to the outer surface of the housing.

In one embodiment, the outer surface of the housing is curved and an underside of the hammer is curved for conforming to the curved outer surface of the housing.

In one embodiment, the hammer includes a head and a claw extending rearwardly from the head.

In one embodiment, the outer surface of the housing has a depression formed therein that is aligned with the claw.

In one embodiment, the claw is a forked claw including a first tine and a second tine spaced from the first tine. The outer surface of the housing desirably has a depression formed therein that is aligned with the first and second tines.

In one embodiment, a writing instrument receptacle is formed in the housing.

In one embodiment, a base is secured to the housing for securing the housing atop a surface.

In one embodiment, the tool includes a spring for selectively retracting the tape. A button may be coupled with the spring, whereby the button is depressible for retracting the tape.

In one embodiment, a clip is attached to the tape measure.

In one embodiment, a combination tape measure and hammer includes a tape measure including a housing having a curved outer surface, and a hammer attached to the housing, whereby the hammer conforms to the curved outer surface of the housing.

In one embodiment, the hammer includes a head and a claw that conforms to the curved outer surface of the housing.

In one embodiment, the curved outer surface of the housing has a depression formed therein and at least a section of the claw is aligned with the depression.

In one embodiment, the section of the claw that is aligned with the depression is spaced from the housing.

In one embodiment, the hammer is integrally formed with the tape measure housing.

In one embodiment, a tool for measuring distances and hammering includes a tape measure including a housing having an outer surface, a tape disposed within the housing and In one embodiment, the hammer includes a head for striking an object and a claw that extends rearwardly from the head, whereby the claw is curved and conforms to the outer surface of the housing. The claw may be used for removing nails and screws.

In one embodiment, a combination tape measure and hammer includes a leveling device incorporated therein for providing a level indicator for the tool.

These and other preferred embodiments of the present invention will be described in more detail below.

BRIEF DESCRIPTION OF THE DRAWING

FIG. 4 shows a top plan view of the combination tape measure and hammer shown in FIG. 1.

FIG. 5 shows a rear elevational view of the combination tape measure and hammer shown in FIG. 1.

FIG. 6 shows a right side elevational view of the combination tape measure and hammer shown in FIG. 1.

FIG. 7 shows a bottom view of the combination tape measure and hammer shown in FIG. 1.

DETAILED DESCRIPTION

Figure 1:
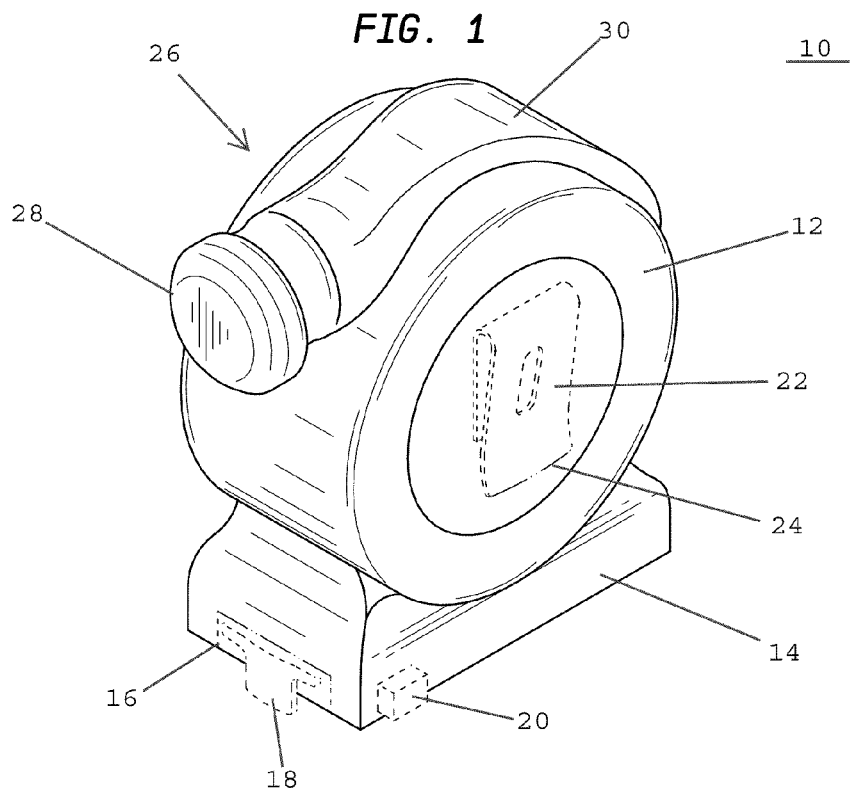
FIG. 1 shows a perspective view of a combination tape measure and hammer, in accordance with one preferred embodiment of the present invention.
Figure 2:
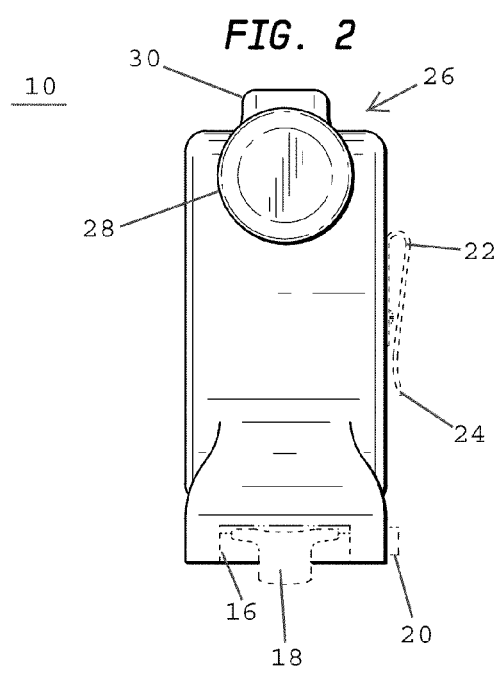
FIG. 2 shows a front elevational view of the combination tape measure and hammer shown in FIG. 1.
Figure 3:
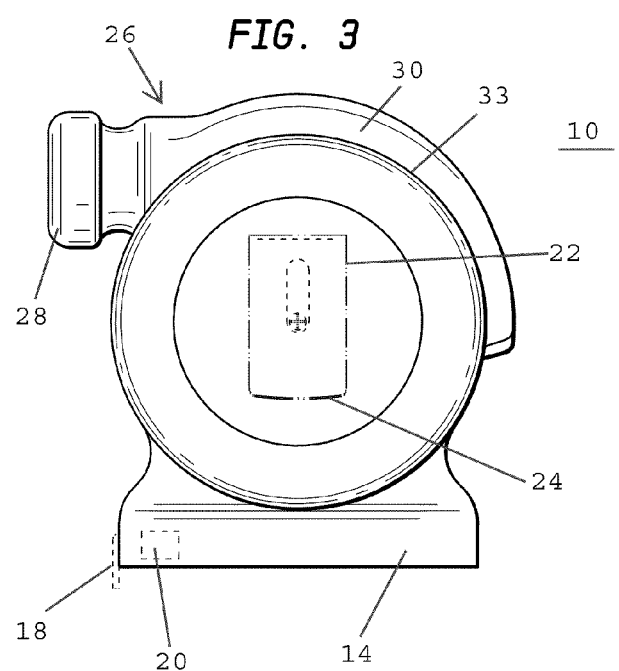
FIG. 3 shows a left side elevational view of the combination tape measure and hammer shown in FIG. 1.

Referring to FIGS. 1-3, in one embodiment of the present invention, a combination tape measure and hammer 10 includes a housing 12 and a base 14 attached to a lower end of the housing 12. In certain preferred embodiments, the base 14 has an opening 16 that is adapted to receive a tape 18 for measuring distances. The tape is desirably secured to a spring (not shown) provided inside the housing 12 for selectively retracting the tape into the housing. The spring may be a coil spring, or other type of well-known spring used for retracting an object. The tape measure preferably includes a button 20 that is depressed for selectively retracting the tape 18 back into the housing. During a measuring operation, the tape 18 may be extended from the housing 12 to measure a distance. The tape may be retracted back into the housing after the measurement has been obtained. When the button 20 is not depressed, the tape 18 will desirably remain stationary (e.g. in an extended position), and will remain stationary until the button 20 is depressed. The housing 12 preferably includes a clip 22 that may be utilized for holding the combination tape measure and hammer 10. The clip 22 has a free end 24 that may be hooked over a structure such as a belt or the waistband of pants.

Referring to FIGS. 1-3, the combination tape measure and hammer 10 also desirably includes a hammer 26 that is coupled with the housing 12. In one embodiment, the hammer 26 includes a head 28 used for striking objects (e.g. nails) and a claw 30 that extends rearwardly from the head 28. As shown in FIGS. 1, 3, and 6, the housing 12 has an outer surface 32 and the claw 30 generally conforms to the outer surface 32 of the housing 12. The conformance of the claw 30 with the outer surface 32 of the housing 12 provides a sleeker, more compact design, which provides a tool that is both easier to carry and use. In one embodiment, the outer surface 32 of the housing 12 is curved, and the claw 30 has a curved underside that conforms to the outer surface of the housing.

FIGS. 4 and 5 show respective top plan and rear views of the combination tape measure and hammer. Referring to FIG. 4, the hammer 26 includes the head 28 that is used for striking objects, such as hammering nails into a wall, and the claw 30 that wraps around the top of the housing 12. In the embodiment shown in FIG. 4, the claw 30 is a forked or split claw including a first tine 34A and a second tine 34B. The two tines 34A, 34B wrap around and conform to the outer surface 32 of the housing 12, as shown in FIG. 6.

Referring to FIGS. 4 and 5, the outer surface 32 of the housing 12 has a depression 36 formed therein. The depression 36 is located underneath and between the two tines 34A, 34B. The depression 36 formed in the housing 12 provides a surface that is engaged by an operator's finger, such as an index finger, to both grip and steady the tool during a hammering operation. The depression 36 also provides a gap between the underside of the tines 34A, 34B and the housing so that the tines may be used to remove fasteners such as nails, tacks, screws, etc. from an object such as a wall or beam. In one embodiment, the depression 36 provides space for the head of a fastener, such as a screw head, the head of a nail, etc.

Referring to FIG. 5, in one embodiment, the base 14 of the tool has an opening 25 formed therein that is adapted to receive a writing instrument such as a pencil or pen. The opening may have any shape including a circular shape and an oblong shape.

Referring to FIGS. 6 and 7, in one embodiment, the underside of the base 14 of the combination measuring tape and hammer 10 defines a substantially flat surface 38 that enables the tool to be securely placed atop a surface such as a tabletop. In one embodiment, the flat surface 38 may sit atop an opposing flat surface, such as a flat table top or flat work bench. The flat surface 38 may also be placed against an opposing flat surface such as a flat wall surface. The flat surface 38 aides an operator to align the tool and obtain proper distance measurements.

Referring to FIG. 6, in one embodiment, the tool 10 includes a leveling device 39 such as a level indicator having fluid and an air bubble. The leveling device 39 may be incorporated into the base 14 of the tool 10.

Figure 8:
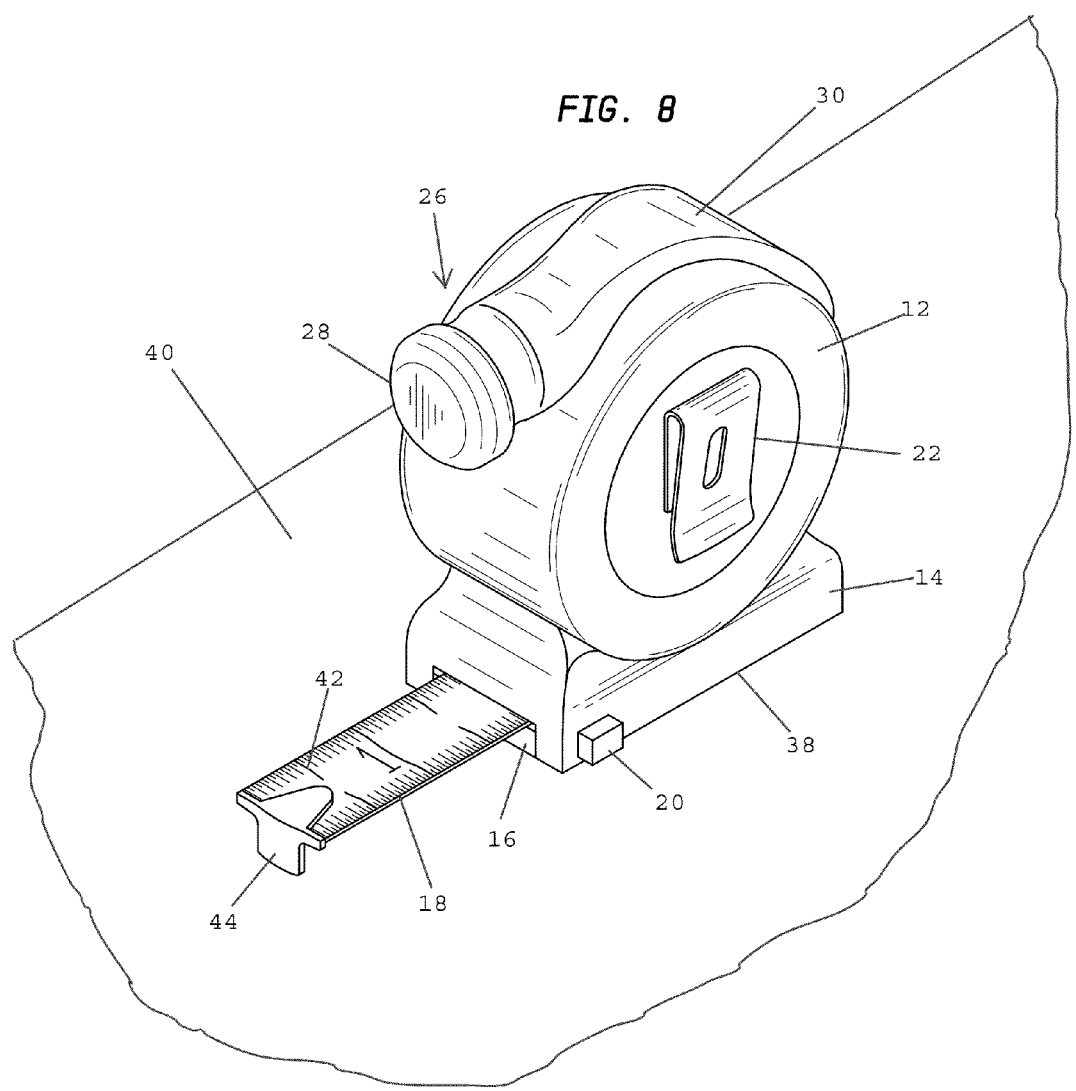
FIG. 8 shows the combination tape measure and hammer of FIG. 1 with a measuring tape extended from a housing.

Referring to FIG. 8, in operation, the flat bottom surface 38 of the base 14 may be placed against an opposing flat surface 40 such as a wall. The tape 18, having measuring indicia 42 provided thereon, may be pulled from the opening 16 in the housing 12 to measure a distance. After a distance has been measured, the tape 18 may be retracted into the housing 12 by pushing the depressible button 20. Once the button 20 is depressed, an internal spring may retract the tape 18 inside the housing 12. In certain embodiments, a rotatable handle may be coupled with the tape for retracting the tape. In other embodiments, the tape may be replaced by a wire or string. A tab 44, attached to a distal end of the tape, desirably halts full retraction of the tape 18 inside the housing 12. Upon retraction, the tab 44 may engage the leading edge of the base 14 for halting retraction of the tape 18. A writing instrument may be removed from the opening 25 (FIG. 5) provided in the base 14, and used to mark a surface. The hammer 26 overlying the housing 12 may be used to strike an object such as a nail, tack, or screw. The head 28 of the hammer is desirably used to drive the nails, tacks, or screws into a structure such as a wall. The combination tool 10 may be gripped and steadied by placing at least one finger in the depression 36 formed in the outer surface of the housing 12. In one embodiment, one of an operator's index fingers is placed in the depression, and the remaining fingers are wrapped around the sides of the housing 12. If the nail, tack, or screw is not properly inserted into the wall, the tines of the forked claw may be used to remove the nail, screw, or tack. The depression formed in the housing enables the head of the nail, screw, or tack to fit between the tines and the outer surface of the housing. The curved shape of the forked claw and tines enables the tool to be readily rolled over the surface holding the nail, tack, or screw to facilitate removal of the nail. As shown in FIGS. 3 and 6, the curved surface of the claw 30 extends above the top of the head 28, which further facilitates rolling action of the tool when removing fasteners from walls or beams. When not being used, the combination measuring tape and hammer may be secured to the operator's belt using the clip 22.

Referring to FIG. 6, in one embodiment, the housing 12 has a magnetic area 50 that is used to attract magnetic objects such as metal nails and screws. A user of the combination tool may use the magnetic area 50 to hold the nails and screws, or other magnetic objects. The housing 12 may also include a writing surface 52 that enables a user to write down data such as measurement data. The writing surface preferably has a coating that may be easily erased after use to prepare the surface for the next use. In one embodiment, the writing surface 52 may record pencil marks thereon, and the pencil markings may be readily wiped away after being used by an operator.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. A combination tape measure and hammer comprising:
    a tape measure having an extendible tape for measuring distances;
    a hammer attached to said tape measure, wherein said tape measure comprises a housing having an outer surface and said hammer is attached to the outer surface of said housing, wherein said hammer includes a claw having a bottom surface that conforms to and directly engages the outer surface of said housing, and wherein there is no elongated shaft between the bottom surface of said claw and the outer surface of said housing.

2. The combination tape measure and hammer as claimed in claim 1, wherein said hammer conforms to the outer surface of said housing.

3. The combination tape measure and hammer as claimed in claim 2, wherein the outer surface of said housing is curved and an underside of said hammer is curved for conforming to the curved outer surface of said housing.

4. The combination tape measure and hammer as claimed in claim 1, wherein said hammer comprises a head and said claw extends rearwardly from said head.

5. The combination tape measure and hammer as claimed in claim 4, wherein the outer surface of said housing has a depression formed therein that is aligned with said claw.

6. The combination tape measure and hammer as claimed in claim 4, wherein said claw is a forked claw including a first tine and a second tine spaced from said first tine.

7. The combination tape measure and hammer as claimed in claim 6, wherein the outer surface of said housing has a depression formed therein that is aligned with said first and second tines.

8. The combination tape measure and hammer as claimed in claim 1, further comprising a writing instrument receptacle formed in said housing.

9. The combination tape measure and hammer as claimed in claim 1, further comprising a spring for selectively retracting said tape.

10. The combination tape measure and hammer as claimed in claim 9, further comprising a button coupled with said spring, wherein said button is depressible for retracting said tape.

11. The combination tape measure and hammer as claimed in claim 1, further comprising a clip attached to said tape measure.

12. A combination tape measure and hammer comprising:
   a tape measure having an extendible tape for measuring distances;
   a hammer attached to said tape measure, wherein said tape measure comprises a housing having an outer surface and said hammer is attached to the outer surface of said housing, and wherein said hammer includes a claw that conforms to the outer surface of said housing;
   a base secured to said housing for securing said housing atop a surface.

13. A combination tape measure and hammer comprising:
   a tape measure including a housing having a curved outer surface;
   a hammer attached to said housing, wherein said hammer conforms to the curved outer surface of said housing, wherein said hammer comprises a head and a claw that cooperatively define a concave bottom surface that conforms to and directly engages the curved outer surface of said housing.

14. The combination tape measure and hammer as claimed in claim 13, wherein said curved outer surface of said housing has a depression formed therein and at least a section of said claw is aligned with said depression.

15. The combination tape measure and hammer as claimed in claim 14, wherein said at least a section of said claw that is aligned with said depression is spaced from said housing.

16. The combination tape measure and hammer as claimed in claim 13, wherein said hammer is integrally formed with said tape measure housing.

17. A tool for measuring distances and hammering comprising:
   a tape measure including a housing having an outer surface;
   a tape disposed within said housing and being extendible from said housing;
   a hammer attached to and conforming to the outer surface of said housing, wherein said hammer includes a head for striking an object and a claw that extends rearwardly from said head, wherein said claw is curved and has a bottom surface that conforms to and directly engages the outer surface of said housing, and wherein there is no elongated element interconnecting said claw and the outer surface of said housing.

* * * * *